US012263130B2

(12) United States Patent
Rowe et al.

(10) Patent No.: US 12,263,130 B2
(45) Date of Patent: Apr. 1, 2025

(54) THERAPEUTIC MOTION DEVICES INCLUDING ARTIFICIAL MUSCLE DRIVE UNITS

(71) Applicant: Toyota Motor Engineering & Manufacturing North America, Inc., Plano, TX (US)

(72) Inventors: Michael P. Rowe, Pinckney, MI (US); Danil Prokhorov, Canton, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 947 days.

(21) Appl. No.: 16/931,589

(22) Filed: Jul. 17, 2020

(65) Prior Publication Data

US 2022/0015977 A1 Jan. 20, 2022

(51) Int. Cl.
*A61H 1/02* (2006.01)
*B25J 9/10* (2006.01)

(52) U.S. Cl.
CPC .............. *A61H 1/02* (2013.01); *A61H 1/024* (2013.01); *A61H 1/0266* (2013.01);
(Continued)

(58) Field of Classification Search
CPC .... A61H 1/024; A61H 1/0266; A61H 1/0277; A61H 1/0281; A61H 2201/1207; A61H 2201/1238; A61H 2201/1409; A61H 2201/5097; A61H 2201/1635; A61H 2201/164; A61H 2201/14; A61H 1/0237–0288; A61H 1/0274;
(Continued)

(56) References Cited

U.S. PATENT DOCUMENTS 7,679,261 B2 3/2010 Chappaz et al.
10,233,910 B2 3/2019 Mazzeo et al.
(Continued)

FOREIGN PATENT DOCUMENTS

CN 2085230 U 9/1991
CN 108721059 * 11/2018 ........... A61H 1/0262
(Continued)

OTHER PUBLICATIONS

CN 108721059 Machine Translation (Year: 2018).*
(Continued)

*Primary Examiner* — Kendra D Carter
*Assistant Examiner* — Arielle Wolff
(74) *Attorney, Agent, or Firm* — Dinsmore & Shohl LLP

(57) ABSTRACT

A therapeutic motion device includes a support structure including a first support portion and a second support portion. The first support portion rotatably coupled to the second support portion and at least one of the first support portion and the second support portion is movable relative to the other of the first support potion and the second support portion. First and second actuation arms extend from the first and second support portions, respectively. An artificial muscle drive unit couples the first actuation arm to the second actuation arm, the artificial muscle drive unit including one or more artificial muscles expandable in a movement direction to provide a movement force to at least one of the first support portion and the second support portion.

19 Claims, 12 Drawing Sheets

(52) U.S. Cl.
CPC ......... *A61H 1/0277* (2013.01); *A61H 1/0281* (2013.01); *B25J 9/1075* (2013.01); *A61H 2201/1207* (2013.01); *A61H 2201/1238* (2013.01); *A61H 2201/1409* (2013.01); *A61H 2201/5097* (2013.01)

(58) Field of Classification Search
CPC ............ A61H 1/02–0296; B25J 9/1075; F15B 15/103; F15B 7/003; F15B 11/20; F15B 11/22
USPC .......................................................... 91/508
See application file for complete search history.

(56) References Cited

U.S. PATENT DOCUMENTS

| | | | |
|---|---|---|---|
| 2010/0280423 | A1 | 11/2010 | Kawakami et al. |
| 2014/0276250 | A1* | 9/2014 | Branch ................ A61H 1/024 601/5 |
| 2019/0365554 | A1 | 12/2019 | Davies-Sekle |
| 2021/0003149 | A1* | 1/2021 | Keplinger ............... F15B 15/10 |
| 2021/0177687 | A1* | 6/2021 | Lamson ................ B25J 9/0006 |

FOREIGN PATENT DOCUMENTS

| | | |
|---|---|---|
| CN | 209812321 U | 12/2019 |
| JP | 2007097292 A | 4/2007 |
| JP | 2012044447 A | 3/2012 |
| JP | 6635430 B2 | 1/2020 |
| WO | 2019002860 A1 | 1/2019 |
| WO | 2019173227 A1 | 9/2019 |
| WO | WO-2019187030 A1 * | 10/2019 |

OTHER PUBLICATIONS

WO 2019/187030 Description Machine Translation (Year: 2019).*
Shane Mitchell, et al., "An Easy-To-Implement Toolkit To Create Versatile And High-Performance HASEL Actuators For Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-voltage-is_fig1_333725822, 15 pages.
E. Acome, et al., "Hydraulically Amplified Self-Healing Electrostatic Actuators With Muscle-Like Performance," Science Journal, Jan. 5, 2018: vol. 359, Issue 6371, pp. 61-651, Department of Mechanical Engineering & Materials Science and Engineering Program, University of Colorado, Boulder, CO 80309, USA.

* cited by examiner

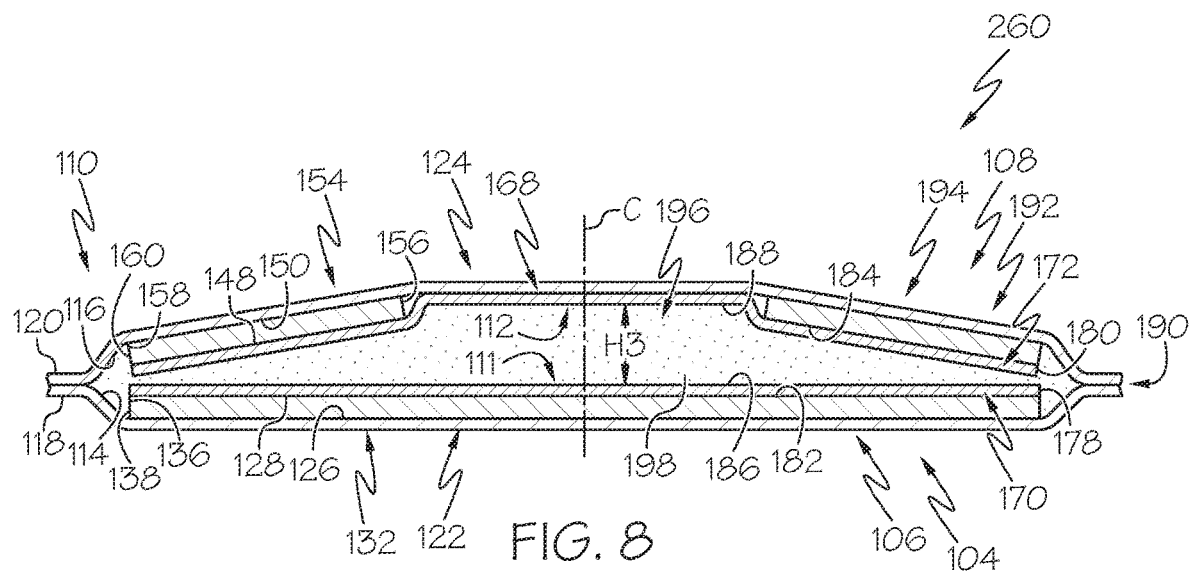
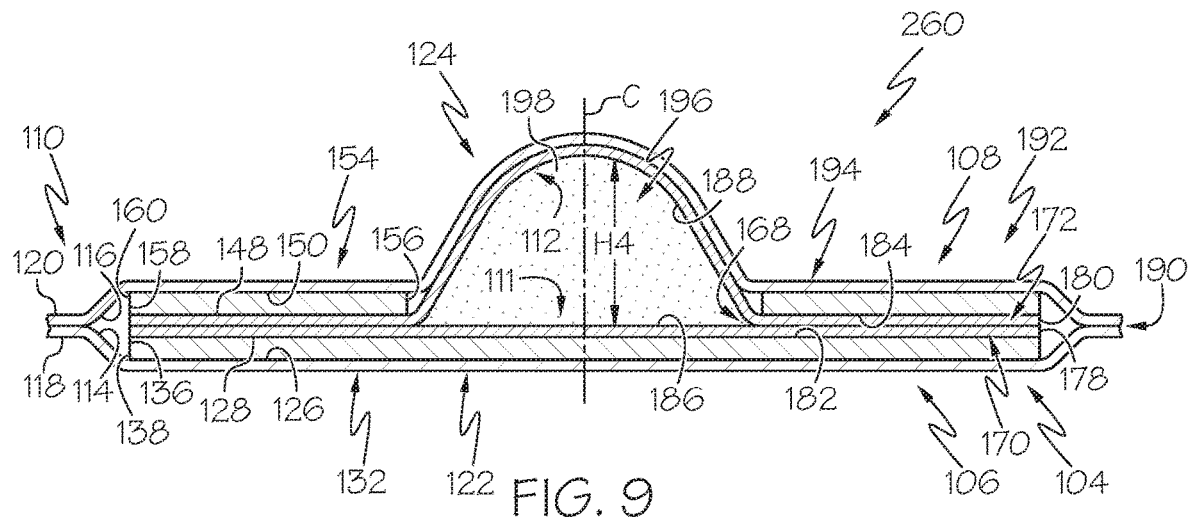

THERAPEUTIC MOTION DEVICES INCLUDING ARTIFICIAL MUSCLE DRIVE UNITS

TECHNICAL FIELD

The present specification generally relates to therapeutic support apparatuses that either assists or resists motion of a user's joint using an artificial muscle drive unit.

BACKGROUND

Motion devices are used to aid recovery from injuries or surgeries. For example motion devices may facilitate motion or use of a limb of a user in a rehabilitation plan from a surgery or trauma to relieve post-operative pain, reduce inflammation, and facilitate healing. Motion machines may be designed for rehabilitation of particular joints of a user (e.g., shoulder, knee, elbow, etc.). Certain motion devices may include actuators or the like to allow for passive motion without any force be supplied by the user. Current technologies for facilitating passive motion or providing variable resistance to movement include pneumatically-driven or electric motor-driven actuators. However, these actuators are complicated, loud, bulky, and not readily portable.

Accordingly, a need exists for improved motion machines capable of providing mechanical force that are low profile and relatively quiet.

SUMMARY

In one embodiment, a therapeutic motion device includes a support structure including a first support portion and a second support portion. The first support portion is rotatably coupled to the second support portion. At least one of the first support portion and the second support portion is movable relative to the other of the first support potion and the second support portion. A first actuation arm extends from the first support portion and a second actuation arm extends from the second support portion. An artificial muscle drive unit couples the first actuation arm to the second actuation arm, the artificial muscle drive unit comprising one or more artificial muscles expandable in a movement direction to provide a movement force to at least one of the first support portion and the second support portion by displacing at least one of the first actuation arm and the second actuation arm.

In another embodiment, a therapeutic motion device includes a support structure including a first support portion and a second support portion. The first support portion is rotatably coupled to the second support portion. At least one of the first support portion and the second support portion is movable relative to the other of the first support potion and the second support portion. An artificial muscle unit connected to the first support portion and the second support portion via actuation arms, the artificial muscle unit comprising one or more artificial muscles configured to apply a force to at least one of the actuation arms. Each of the one or more artificial muscles includes a housing comprising an electrode region and an expandable fluid region, a dielectric fluid housed within the housing, and an electrode pair positioned in the electrode region of the housing. The electrode pair includes a first electrode fixed to a first surface of the housing and a second electrode fixed to a second surface of the housing. The electrode pair is actuatable between a non-actuated state and an actuated state such that actuation from the non-actuated state to the actuated state directs the dielectric fluid into the expandable fluid region, expanding the expandable fluid region thereby applying force to the at least one of the actuation arms.

In yet another embodiment, a method for actuating a therapeutic motion device, the method includes generating a voltage using a power supply electrically coupled to an electrode pair of an artificial muscle, the artificial muscle disposed in an artificial muscle drive unit coupled to first support portion and a second support portions of the therapeutic motion device. The artificial muscle comprises a housing having an electrode region and an expandable fluid region; and the electrode pair is positioned in the electrode region of the housing. The electrode pair comprises a first electrode fixed to a first surface of the housing and a second electrode fixed to a second surface of the housing; and a dielectric fluid is housed within the housing. The method also includes applying the voltage to the electrode pair of the artificial muscle, thereby actuating the electrode pair from a non-actuated state to an actuated state such that the dielectric fluid is directed into the expandable fluid region of the housing and expands the expandable fluid region, thereby providing force to at least one of the first support portion and the second support portion to resist or assist movement of at least one of the first support portion and the second support portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 8 schematically depicts a cross-sectional view of another illustrative artificial muscle in a non-actuated state, according to one or more embodiments shown and described herein;

FIG. 9 schematically depicts a cross-sectional view of the artificial muscle of FIG. 8 in an actuated state, according to one or more embodiments shown and described herein;

DETAILED DESCRIPTION

Embodiments described herein are directed to therapeutic motion devices that include one or more artificial muscle drive units configured to selectively apply at least one of assistive force or resistive force to motion of a user. For example, the therapeutic motion devices described herein may assist the user in bending a joint of the user as a part of rehabilitating the joint (e.g., after performance of surgery, for recovering from an injury, or the like). The therapeutic motion devices described herein may include a first support portion and a second support portion adapted to support limbs of the user on either side of a joint (e.g., a shoulder, an ankle, an elbow, etc.) of the user. The first support portion and the second support portion are rotatable with respect to each other such that the first support portion and the second support portion support the limbs as the joint moves. An artificial muscle drive unit couples movement of the first support portion to movement of the second support portion. In embodiments, the artificial muscle drive unit includes actuation arms coupled to the first support portion and the second support portion. The actuation arms are coupled to a plurality of artificial muscles disposed in the artificial muscle drive unit. The plurality of artificial muscles may be actuated to selectively provide force against the actuation arms to either change a relative orientation between the first and second support portions (e.g., to provide assistive force to the user moving the joint) or to resist a change in relative orientation between the first and second support portions (e.g., to resist movement of the joint).

Figure 1A:
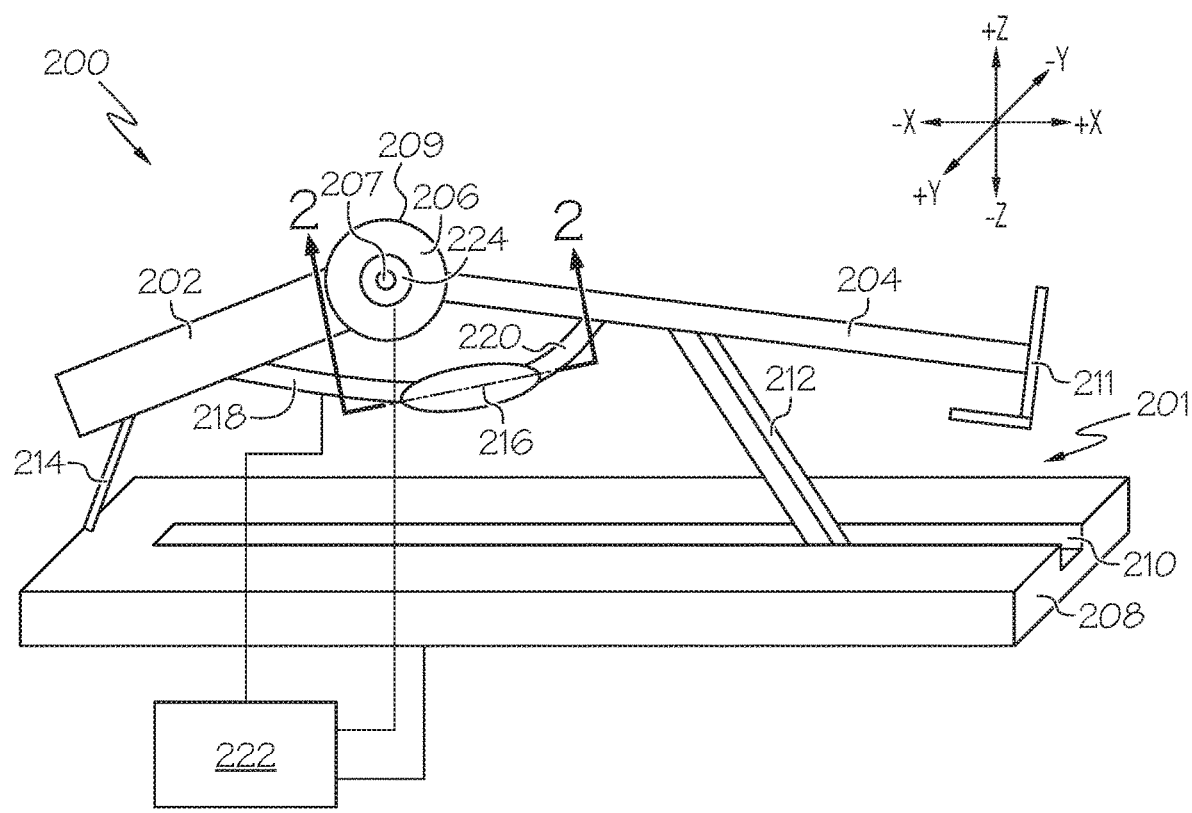
FIG. 1A schematically depicts a therapeutic motion device including an artificial muscle drive unit, according to one or more embodiments described herein.

Referring now to FIG. 1A, a therapeutic motion device 200 is schematically depicted. The therapeutic motion device 200 may assist or resist motion of a user's knee. As depicted, the therapeutic motion device 200 includes a support structure 201. The support structure 201 includes a first support portion 202 and a second support portion 204. The relative orientation of the first support portion 202 and the second support portion 204 is generally adjustable such that the first support portion 202 and the second support portion 204 support a leg of the as the user bends her knee (e.g., the first support portion 202 is rotatably coupled to the second support portion 204). For example, in embodiments, the first support portion 202 and the second support portion 204 are positioned and held in spaced relation by the support structure 201 such that a user's knee is between the first support portion 202 and the second support portion 204, the first support portion 202 supports the user's upper leg (e.g., thigh), and the second support portion 204 supports the user's lower leg. In embodiments, the user's leg is strapped to the first and second support portions 202 and 204 to facilitate maintaining the positioning of the user's leg on the therapeutic motion device 200. In embodiments, the first and second support portions 202 and 204 are adjustable in various respects (e.g., in length, in relative positioning) to accommodate various users. As depicted, the therapeutic motion device 200 includes a foot rest 211 that receives a foot of the user to secure the user's leg in the therapeutic motion device 200.

In embodiments, the first support portion 202 is connected to the second support portion 204. For example, in the embodiment depicted in FIG. 1A, the first support portion 202 is coupled to the second support portion 204 with a rotatable connector 206. In embodiments, the rotatable connector 206 is disposed proximate to the user's knee when the user is positioned on the therapeutic motion device 200. In the depicted example, the rotatable connector 206 includes an outer portion 209 and a rotating portion 207 (e.g., rotatably coupled to the outer portion 209 and disposed within a central opening in the outer portion 209). In embodiments, one of the first support portion 202 and the second support portion 204 is attached to the outer portion 209 and the other of the first support portion 202 and the second support portion 204 is attached to the rotating portion 207 so that a relative angle of extension between the first and second support portions 202 and 204 is adjustable via the rotatable connector 206. For example, in the embodiment depicted, the first support portion 202 is attached to the outer portion 209, while the second support portion 204 is attached to the rotating portion 207. It should be understood that alternative structural arrangements between the first support portion 202 and the second support portion 204 are contemplated and within the scope of the present disclosure. For example, in embodiments, the first and second support portions 202 and 204 are not directly connected to one another, but held in a desired relative position by the support structure 201.

Referring still to FIG. 1A, a base 208 supports the first support portion 202 and the second support portion 204. A support arm 212 extends from the base 208 to the second support portion 204 and a rear support arm 214 is coupled to the base 208 and the first support portion 202. In embodiments, the rear support arm 214 is fixedly attached to the base 208 and the first support portion 202 is rotatably attached to the rear support arm 214 (e.g., via a rod, not depicted, extending through the rear support arm 214 and the first support portion 202). The base 208 includes a track 210. An end (not depicted) of the support arm 212 is slidably engaged with the track 210 (e.g. via a roller assembly, not depicted, engaged with the end of the support arm 212). As such, a portion of the second support portion 204 is movable in a first direction (e.g., in the X-direction) relative to the first support portion 202. As the second support portion 204 moves relative to the first support portion 202, the relative angle between the first and second support portions 202 and 204 changes at the rotatable connector 206 such that the relative angle between the first and second support portions 202 and 204 corresponds to the relative angle between the user's upper and lower legs as the user bends her knee. That is, the relative motion between the first and second support portions 202 and 204 facilitates the user bending her knee while her leg is supported by and/or secured by both the first and second support portions 202 and 204. It should be understood that certain embodiments may not include the base 208 and track 210, but rather include separate support structures for the first and second support portions 202 and 204.

The therapeutic motion device 200 further includes an artificial muscle drive unit 216 disposed between the first support portion 202 and the second support portion 204. An actuation arm 220 couples the artificial muscle drive unit 216 to the second support portion 204 and an actuation arm 218 couples the artificial muscle drive unit 216 to the first support portion 202. The artificial muscle drive unit 216 includes a plurality of artificial muscles disposed therein. The artificial muscle drive unit 216 is connected to an actuation system 222. The actuation system 222 is configured to provide control signals to selectively activate the plurality of artificial muscles disposed in the artificial muscle drive unit 216. In embodiments, in response to receiving an activation signal from the actuation system 222, at least a portion of the plurality of artificial muscles expand in a predetermined direction (e.g., in the X-direction) to place a force on at least one of the actuation arms 218 and 220 so as to assist the user in bending her knee or to provide resistance to the user bending her knee. Operation of the artificial muscle drive unit 216 and the artificial muscles therein is described in greater detail herein with respect to FIGS. 2A, 2B, and 4-9.

While the artificial muscle drive unit 216 disposed between the first and second support portions 202 and 204 is the only artificial muscle drive unit shown in FIG. 1A, it should be understood that various alternative and additional artificial muscle drive units are contemplated and within the scope of the present disclosure. For example, in embodiments, the base 208 includes an additional artificial muscle drive unit similar to the artificial muscle drive unit 216 described herein. The additional artificial muscle drive unit may supply force to the support arm 212 responsive to control signals from the actuation system 222 to move the support arm 212 within the track 210 to facilitate rotation of the user's joint in different directions.

Referring still to FIG. 1A, the therapeutic motion device 200 further includes a motion resistance device 224 disposed on the rotatable connector 206. The motion resistance device 224 is communicably coupled to the actuation system 222. In embodiments, the motion resistance device 224 is configurable between a non-engagement position where the outer portion 209 and the rotating portion 207 of the rotatable connector 206 are freely rotatable relative to one another to facilitate the user bending and straightening her knee, and an engagement position. In the engagement position, the motion resistance device 224 may prevent or resist rotation of the outer portion 209 relative to the rotating portion 207 to prevent alteration of the relative positioning of the first and second support portions 202 and 204. That is, placing the motion resistance device 224 in the engagement position may either provide resistance to rotation of the rotatable connector 206 to provide resistance to the user bending or straightening her knee or prevent rotation of the rotatable connector 206 so that the knee of the user remains stationary. It may be beneficial to prevent motion of the user's knee if the user tires during exercising. In embodiments, placing the motion resistance device 224 in the engagement position prevents relative movement between the first and second support portions 202 and 204 in one direction (e.g., the positive X-direction) and allows relative movement between the first and second support portions 202 and 204 in a second direction (e.g., the negative X-direction). In embodiments, the motion resistance device 224 includes an artificial muscle drive unit similar to the artificial muscle drive unit 216 described herein.

Figure 1B:
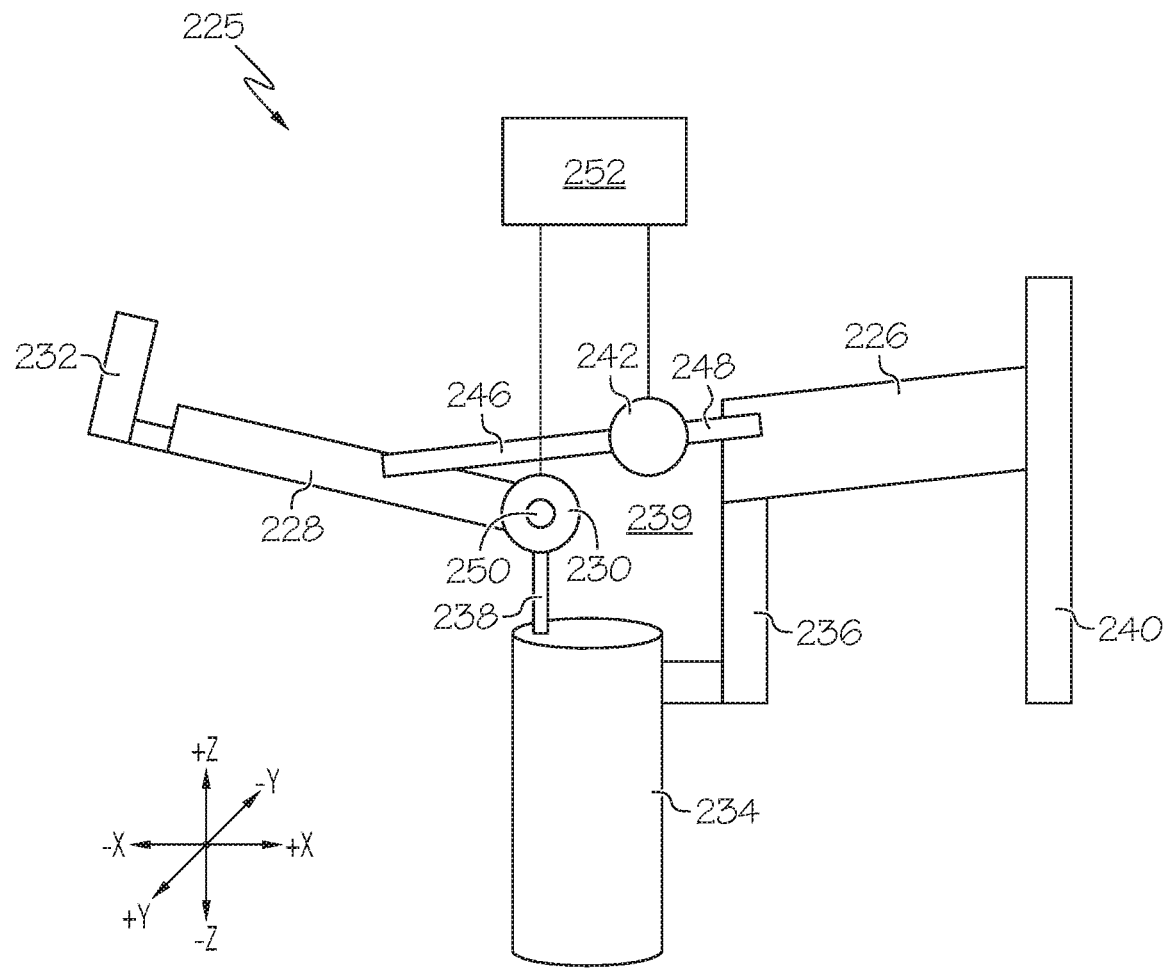
FIG. 1B schematically depicts a therapeutic motion device including an artificial muscle drive unit, according to one or more embodiments described herein.

Referring now to FIG. 1B, a therapeutic motion device 225 is schematically depicted. The therapeutic motion device 225 is an alternative embodiment of the therapeutic motion device 200 described with respect to FIG. 1A. In embodiments, the therapeutic motion device 225 is structured to support a user's arm during bending and straightening of the user's elbow. As depicted, the therapeutic motion device 225 includes a first support portion 226 adapted to support a first portion of the user's arm (e.g., an upper arm) and a second support portion 228 adapted to support a second portion of the user's arm (e.g., a forearm). The relative orientation of the first support portion 226 and the second support portion 228 is generally adjustable such that the first support portion 226 and the second support portion 228 support an arm of the as the user bends her elbow. For example, in embodiments, the first support portion 226 and the second support portion 228 are positioned such that a user's elbow is between the first support portion 226 and the second support portion 228, such that the first support portion 226 supports a user's upper arm the second support portion 228 supports a user's forearm (e.g., the first support portion 226 is rotatably coupled to the second support portion 228 via a base 234). In embodiments, the user's arm is strapped to the first and second support portions 226 and 228 to facilitate maintaining the positioning of the user's arm on the therapeutic motion device 225. In embodiments, the first and second support portions 226 and 228 are adjustable in various respects (e.g., in length, in relative positioning) to accommodate various users. As depicted, the therapeutic motion device 225 includes a handle 232 that the user may grab while using the therapeutic motion device 225.

The first and second support portions 226 and 228 are both connected to a base 234. As depicted, the first support portion 226 is connected to both the base 234 via a support arm 236 as well as a support structure 240. In embodiments, the base 234 and the support structure 240 are each a part of a larger structure such as a seat or the like. For example, in embodiments, the support structure 240 is a vertical surface for supporting the user's back while using the therapeutic muscle device 225. The second support portion 228 is coupled to the base 234 via a rotatable connector 230 that is attached to a support arm 238 extending from the base 234. The rotatable connector 230 may have a structure similar to the rotatable connector 206 described with respect to 1A. In embodiments, the second support portion 228 is coupled to a rotating portion of the rotatable connector 230 such that, via the rotatable connector 230, the relative angular orientation between the first and second support portions 226 and 228 may be adjusted to facilitate the user bending and straightening her elbow while using the therapeutic motion device 225.

The therapeutic motion device 225 depicted in FIG. 1B differs from the therapeutic muscle device 200 depicted in FIG. 1A in that there is a gap 239 between the first and second support portions 226 and 228. That is, the first and second support portions 226 and 228 are not directly connected via the rotatable connector 230. Such an arrangement facilitates independent rotation of the second support portion 228 and independent adjustability, though it should be understood that in alternative embodiments, the first and second support portions 226 and 228 may be connected to one another via the rotatable connector 230. In embodiments, the user's elbow is disposed in the gap 239 when the user's arm is supported by the therapeutic muscle device 225.

The therapeutic motion device 225 further includes an artificial muscle drive unit 242 disposed between the first and second support portions 226 and 228. An actuation arm 246 couples the artificial muscle drive unit 242 to the second support portion 228 and an actuation arm 248 couples the artificial muscle drive unit 242 to the first support portion 226. The artificial muscle drive unit 242 may be similar in structure to the artificial muscle drive unit 216 described herein. In embodiments, the artificial muscle drive unit 242 includes a plurality of artificial muscles that expand in a particular direction (e.g., the X-direction) in response to receiving a control signal from the actuation system 252. The expansion may supply force to at least one of the actuation arms 246 and 248 to assist or resist relative movement between the first and second support portions 226 and 228 in various directions. The actuation system 252 may operate in a similar manner to the actuation system 222 described herein with respect to FIG. 1A.

In the example shown, the therapeutic muscle device 225 also includes a motion resistance device 250 that operates similar to the motion resistance device 224 described herein with respect to FIG. 1A. Responsive to control signals from the actuation system 252, the motion resistance device 224 may prevent or resist motion of the second support portion 228 relative to the base 234 to, for example, allow the user to rest in the middle of a movement. It should be understood that the therapeutic motion devices 200 and 225 described herein are exemplary only and the artificial muscle drive units described herein may be used in various alternative therapeutic motion devices adapted to facilitate motion of any joint (e.g., an ankle, a wrist, a finger, a shoulder, and the like).

Figure 2A:
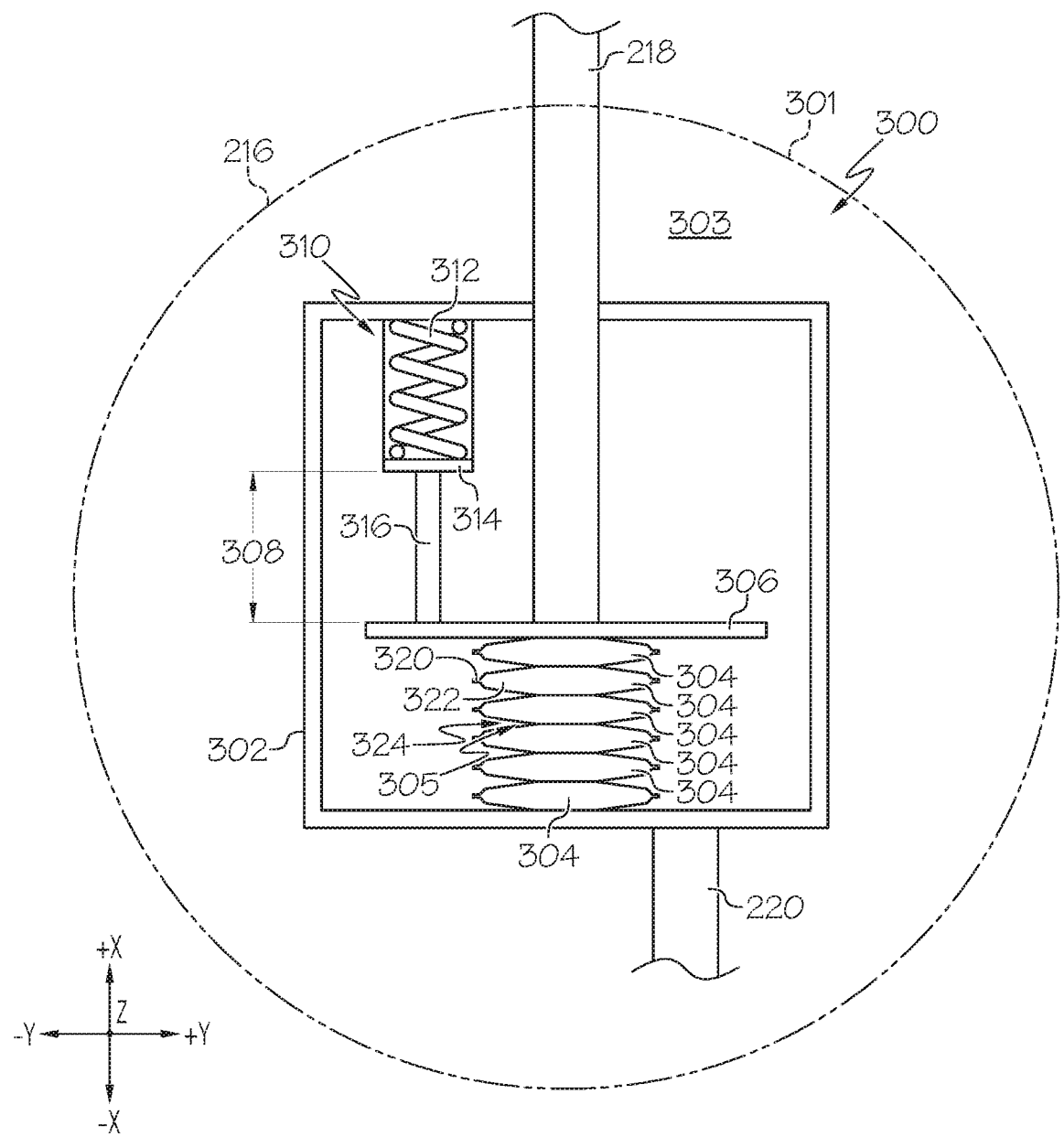
FIG. 2A schematically depicts a cross sectional view of artificial muscle drive unit of the therapeutic motion device of FIG. 1A taken along line II-II in a non-actuated state, according to one or more embodiments described herein.
Figure 2B:
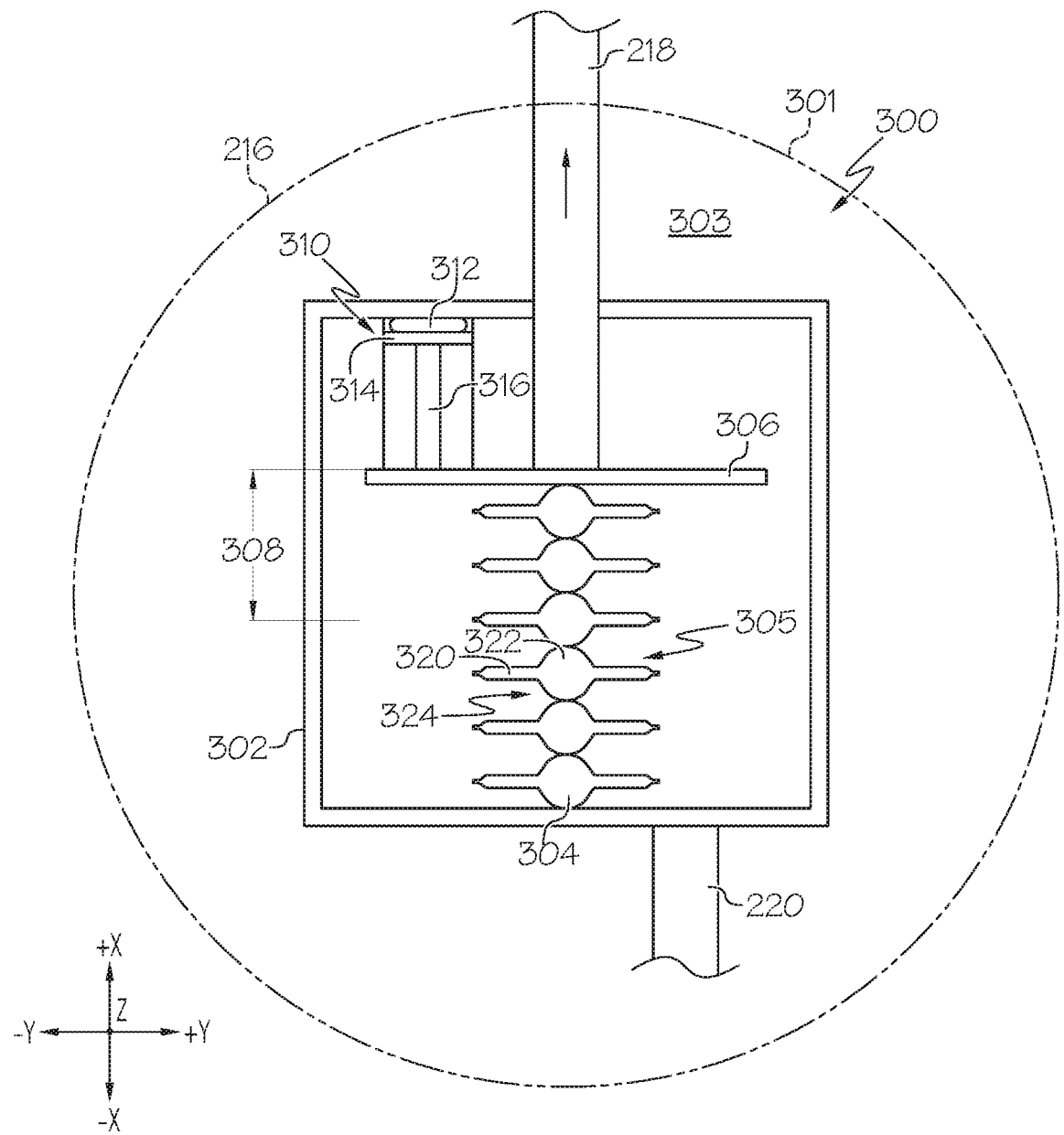
FIG. 2B schematically depicts a cross sectional view of artificial muscle drive unit of the therapeutic motion device of FIG. 1A taken along line II-II in an-actuated state, according to one or more embodiments described herein.

Referring now to FIGS. 2A and 2B, cross-sectional views of the artificial muscle drive unit 216 through the line II-II of FIG. 1A are schematically depicted. FIG. 2A depicts a cross-sectional view of the artificial muscle drive unit 216 in a non-actuated state (e.g., in the absence of an activation signal from the actuation system 222 described with respect to FIG. 1A). FIG. 2B depicts a cross-sectional view of the artificial muscle drive unit 216 in an actuated state (e.g., in the presence of the activation signal). The artificial muscle drive unit 216 includes an outer casing 301 and an artificial muscle assembly 300 disposed therein. The artificial muscle assembly 300 includes an inner casing 302 supported within a cavity 303 defined by the outer casing 301 and an actuation plate 306 disposed within the inner casing 302. In embodiments, the inner casing 302 is fixedly disposed within the cavity 303 (e.g., via a support bracket, not depicted, attached to the outer casing 301) and the actuation plate is movable with respect to the inner casing 302.

The actuation arm 218 extending between the artificial muscle drive unit 216 and the first support portion 202 (see FIG. 1A) extends through the outer casing 301 and the inner casing 302 and attaches to the actuation plate 306 of the artificial muscle assembly 300. In embodiments, the actuation arm 218 may not extend through the outer casing 301 or the inner casing 302, but may be coupled to the actuation plate 306 or outer casing 301 via an extension arm (not depicted). The actuation arm 220 extending between the artificial muscle drive unit 216 and the second support portion 204 (see FIG. 1A) extends through the outer casing 301 and is attached to the inner casing 302. In embodiments, the actuation arm 220 does not extend through the outer casing 301 but is in contact with the outer casing 301. It should be understood that alternative structures are contemplated and within the scope of the present disclosure. For example, in embodiments, the artificial muscle assembly 300 may be rearranged such that the actuation arm 220 is attached to the actuation plate 306 rather than the actuation arm 218.

The artificial muscle assembly 300 includes a one or more artificial muscles 304 extending between the actuation plate 306 and the inner casing 302. In the embodiments of FIGS. 2A and 2B, each artificial muscle 304 is one of a plurality of artificial muscles 305. The plurality of artificial muscles 305 are stacked on top of one another in a movement direction (e.g., in the X-direction of FIGS. 2A and 2B). In operation, the one or more artificial muscles 304 are actuatable to expand and apply a force to the actuation plate 306 to thereby impart a force on at least one of the actuation arms 218 and 220 and effectuate assistance or resistance to motion of a limb of a user on an incorporating therapeutic motion device. In embodiments, the plurality of artificial muscles 305 are stacked in the structure described herein with respect to FIG. 10. While the plurality of artificial muscles 305 are depicted to be arranged in a single stack, it should be understood that in various embodiments, the plurality of artificial muscles 305 may include any number of stacks arranged in a direction perpendicular to the desired movement direction. For example, in embodiments, the plurality of artificial muscles 305 may include two or more stacks of artificial muscles, with each stack being arranged next to another stack such that the two or more stacks are offset from one another in the Y-direction depicted in FIG. 2A.

The one or more artificial muscles 304 each include an electrode region 320 (e.g., corresponding to the electrode region 194 described herein with respect to FIGS. 4-9) and an expandable fluid region 322 (e.g., corresponding to the expandable fluid region 196 described herein with respect to FIGS. 4-9). Both the electrode region 320 and the expandable fluid region 322 are disposed in a housing 324 (e.g., corresponding to the housing 110 described herein with respect to FIGS. 4-9) containing a dielectric fluid (not depicted). In embodiments, the electrode region 320 includes an electrode pair (e.g., corresponding to the electrode pair 104 described herein with respect to FIGS. 4-9) including electrodes that are drawn toward one another in response to a voltage being applied to the electrode pair (e.g., from the actuation system 222). FIG. 2A depicts the plurality of artificial muscles 305 in a completely non-actuated state. In such a case, dielectric fluid may fill the region between the electrode pair and each artificial may have a minimal dimension (e.g., width) in the movement direction.

FIG. 2B depicts the plurality of artificial muscles 305 in a completely actuated state. For example, in embodiments, the actuation system 222 described herein with respect to FIG. 1A provides a voltage simultaneously to each of the plurality of artificial muscles 305 so as to cause the electrode pairs in each of the plurality of artificial muscles 305 to be electrostatically attracted to one another such that the expandable fluid region 322 contracts at a periphery thereof to force dielectric fluid to a central region thereof, thereby causing a central portion of the expandable fluid region 322 to expand in the movement direction. As a result of the expansion of each of the plurality of artificial muscles 305, a force may be applied to the actuation plate 306 to cause movement of the actuation plate 306 in the movement direction.

As depicted in FIGS. 2A-2B, simultaneously applying a voltage to each of the plurality of artificial muscles 305 may cause movement of the actuation plate 306 by a distance 308 in the movement direction. In embodiments, such movement of the actuation plate 306 causes a corresponding movement of the actuation arm 218, thereby causing force to be imparted on the first support portion 202. In embodiments, the force supplied by the plurality of artificial muscles 305 is sufficient to result in passive motion of a limb of a user when the user is positioned on the therapeutic motion device 200. It should be understood that the actuation system 222 may selectively apply voltage to any combination of the plurality of artificial muscle 305 to provide a customizable amount of force to the first support portion 202.

Referring still to FIGS. 2A and 2B, the artificial muscle assembly 300 further includes a return force device 310 coupled to the inner casing 302. The return force device 310 includes a spring member 312 that is attached to a plunger 314. An extension rod 316 couples the plunger 314 to the actuation plate 306. As depicted in FIG. 2A, when the plurality of artificial muscles 305 are in the non-actuated state, the spring member 312 is in an un-compressed state. As depicted in FIG. 2B, when the plurality of artificial muscles 305 are in an actuated state, the actuation plate 306 presses the extension rod 316 in the movement direction such that the plunger 314 compresses the spring member 312. In embodiments, the spring member 312 is constructed (e.g., includes a length, number of coils, and constructed from a material) such that the magnitude of the force resulting from the expansion of the plurality of artificial muscles 305 in the movement direction overcomes the compressive force of the spring member 312. For example, as depicted in FIG. 2B, when the plurality of artificial muscles 305 are in an actuated state, the spring member 312 is in a compressed state such that the distance 308 corresponds to a combined change in dimension of the plurality of artificial muscles 305 (e.g., the combined increase of width of the plurality of artificial muscles 305 in the X-direction).

In embodiments, once the plurality of artificial muscles 305 are in the actuated state depicted in FIG. 2B, the voltage may be removed from the plurality of artificial muscles 305 such that the electrode pairs thereof are no longer attracted to one another and the dielectric fluid may enter a space between the electrode pairs. In embodiments, once the voltage is removed, the spring member 312 supplies a return force to the actuation plate 306. As such, once the voltage is removed, the actuation arm 218 may be forced back to a starting position in the movement direction. By periodically applying voltage to the plurality of artificial muscles 305, the actuation arm 218 may cyclically move (or be forced) in the movement direction. In embodiments, such cyclical movement may be used to assist the user in moving a joint in a desired movement pattern.

Various alternative return force devices are envisioned. For example, alterative embodiments may include a plurality of return force devices similar to the return force device 310. In embodiments, rather than being disposed within the inner casing 302, the return force device 310 extends between the inner casing 302 and the outer casing 301 within the cavity 303. Certain embodiments may not include the inner casing 302 and the plurality of artificial muscles 305 may extend from the outer casing 301 to the actuation plate 306 and the return force device 310 may be disposed on an opposing side of the actuation plate 306 and be connected to the outer casing 301. In embodiments, the return force device 310 is disposed on the same side of the actuation plate 306 as the plurality of artificial muscles 305 (e.g., the spring member 312 may be directly connected to the actuation plate 306 such that the spring member 312 is stretched when the actuation plate 306 in the positive X-direction). Any structure capable of providing return force may be used in place of the spring member 312 (e.g., electric actuators, pneumatic devices, and the like).

Alternative structures for the artificial muscle drive unit 216 are also contemplated and within the scope of the present disclosure. For example, in embodiments, the outer casing 301 is constructed of a flexible material and the plurality of artificial muscles may be in contact with the outer casing 301 such that a change in dimension of plurality the artificial muscles 305 may also change the shape of the outer casing 301. The first and second support portions 202 and 204 may be coupled to the outer casing 301 such that the change in shape of the outer casing 301 changes a relative orientation between the first and second support portions 202 and 204 to place force on the user's limb in a desired manner. Any structure capable of transforming the linear motion induced by the dimensional change in the plurality of artificial muscles 305 to provide force on the first and second support portions 202 and 204 may be used consistent with the present disclosure.

Figure 3A:
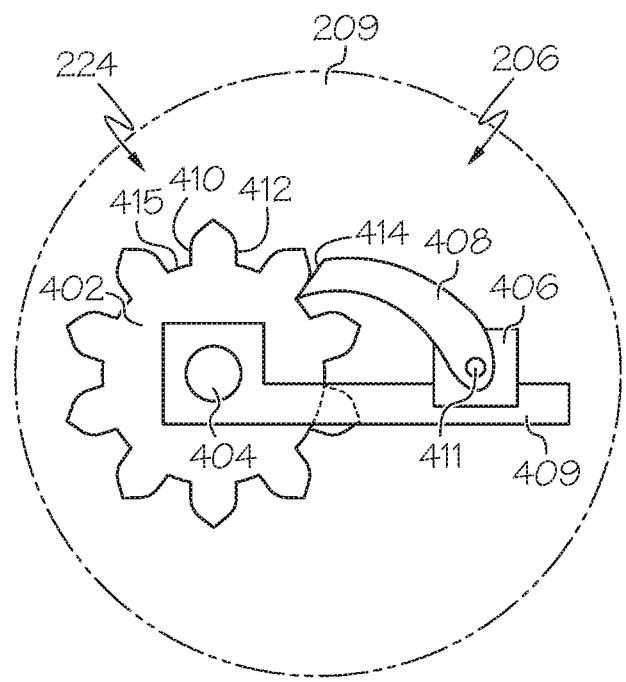
FIG. 3A schematically depicts a motion resistance device of the therapeutic motion device of FIG. 1A, according to one or more embodiments described herein.

Referring now to FIG. 3A, an embodiment of the motion resistance device 224 described with respect to FIG. 1A is schematically depicted. The motion resistance device 224 includes a gear 402 that is attached to a central axle 404. In embodiments, the central axle 404 corresponds to the rotating portion 207 of the rotating connector 206 described with respect to FIG. 1A. In embodiments, the second support portion 204 may be fixedly attached to the central axle 404 such that turning the second support portion 204 causes rotation of the central axle 404. A support bracket 409 is coupled to an end of the central axle 404. A pawl 408 is coupled to the support bracket 409 via an actuator 406. In embodiments, the actuator 406 is an electronic motor that rotates the pawl 408 by rotating a pawl axle 411.

The gear 402 includes a plurality of teeth 410 at an outer circumferential edge thereof. Each of the plurality of teeth 410 includes a locking surface 412 extending in a radial direction of the gear 402 (e.g., towards a center of the central axle 404). The gear 402 also includes a curved surface 415. As depicted in FIG. 3A, when the pawl 408 is in an engagement position, and end 414 of the pawl 408 contacts a locking surface 412 of one of the teeth 410. In embodiments, the actuator 406 provides sufficient rotational force to maintain the pawl 408 in the engagement position despite any counter-rotational force from the gear 402 resulting from force applied to the axle 404. Thus, in the depicted embodiment, any force supplied to the central axle 404 via the second support portion 204 (see FIG. 1A) in the clockwise direction would be counteracted via the pawl 408. That is, the motion resistance device 224 is configured to prevent the user from bending her knee further if the motion resistance device 224 is activated to place the pawl 408 in the depicted engagement position. If the user gets tired during bending her knee, the motion resistance device 224 may be activated to pause the motion.

Referring still to FIG. 3A, the motion resistance device 224 may include any number of pawl and actuator combinations to provide varying levels of resistance to rotation in various rotational directions. For example, in another embodiment, the motion resistance device 224 includes an additional gear (not depicted) that is similar in structure to the gear 402, but mounted on the axle with in an opposite orientation. In this example, the motion resistance device 224 includes an additional pawl and actuator to engage with the locking surfaces of the additional gear to provide the capability of prevent movement of the second support portion 204 in the opposite direction as the pawl 408 (e.g., the additional pawl may prevent the user from straightening her knee further than when the additional pawl is placed in the engagement position).

Figure 3B:
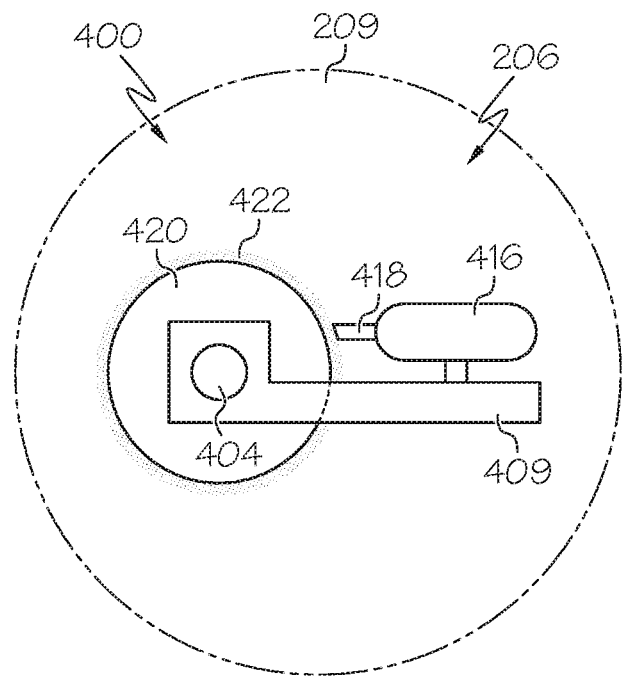
FIG. 3B schematically depicts a motion resistance device of the therapeutic motion device of FIG. 1A, according to one or more embodiments described herein.

Referring now to FIG. 3B, an alternative motion resistance device 400 is schematically depicted. The motion resistance device 400 includes the central axle 404 and support bracket 409 described with respect to FIG. 3A. The motion resistance device 400 depicted in FIG. 3B differs from the motion resistance device 224 in that the gear 402 is replaced with the gear 420. Rather than including a plurality of teeth 410, the gear 420 includes a textured surface 422. Additionally, in the motion resistance device 400, the actuator 406 is replaced with the artificial muscle drive unit 416. The artificial muscle drive unit 416 may be similar in structure to the artificial muscle drive unit 216 described herein with respect to FIGS. 2A and 2B, and move an actuation arm 418 towards the textured surface 422 in response to a voltage being supplied thereto by the actuation system 222. In response to the voltage, the actuation arm 418 may contact the textured surface 422 to create friction between the actuation arm 418 and the textured surface 422. Such friction may resist motion of the second support portion 204 providing the user with a level of resistance of motion that may be adjusted based on the activation signal provided to the artificial muscle drive unit 416. As described with respect to FIG. 3A, the therapeutic motion devices described herein may include any number of the motion resistance devices 400 to resist movement in any number of directions.

Figure 4:
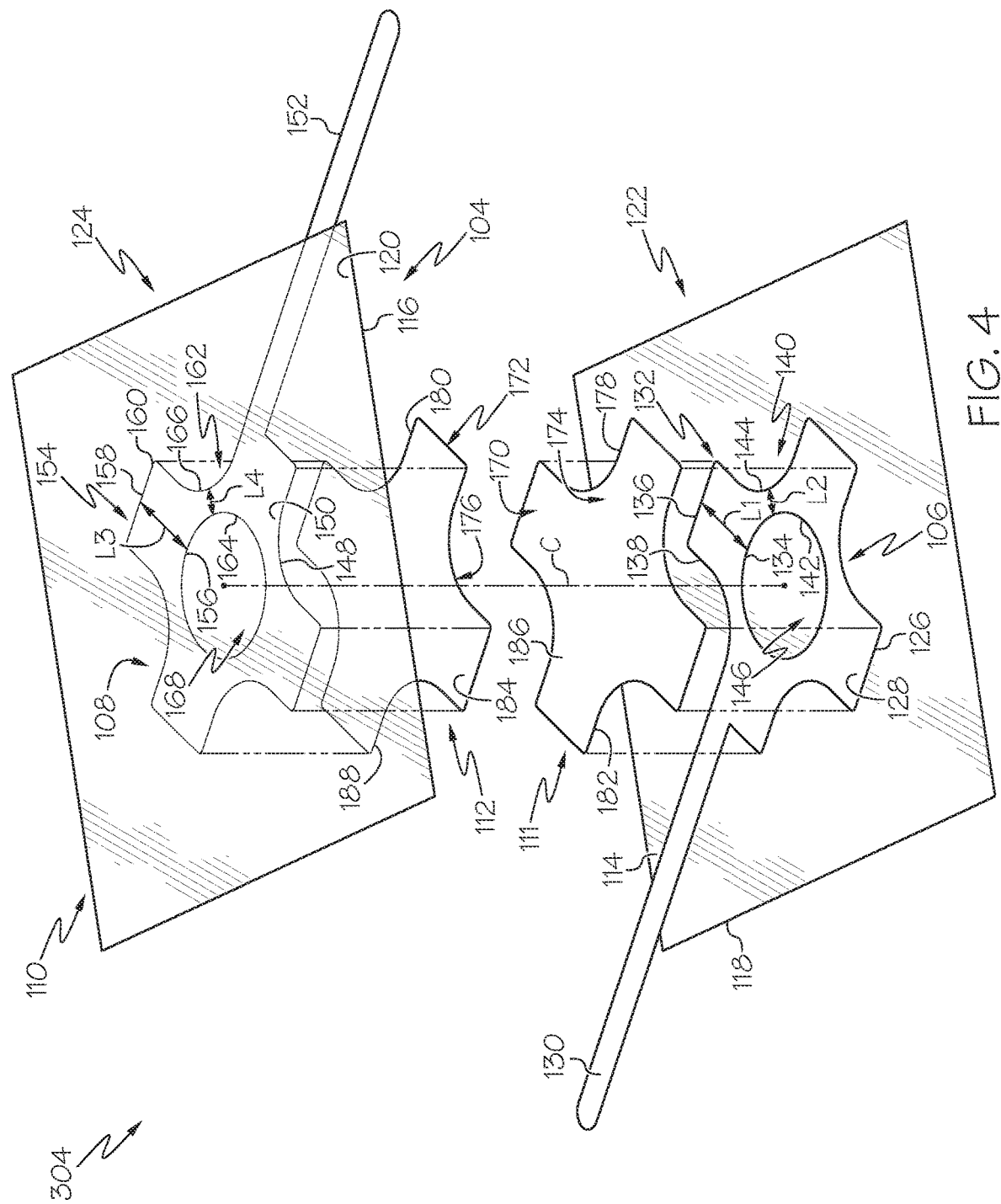
FIG. 4 schematically depicts an exploded view of an illustrative artificial muscle of the therapeutic motion device of FIG. 1A, according to one or more embodiments shown and described herein.
Figure 5:
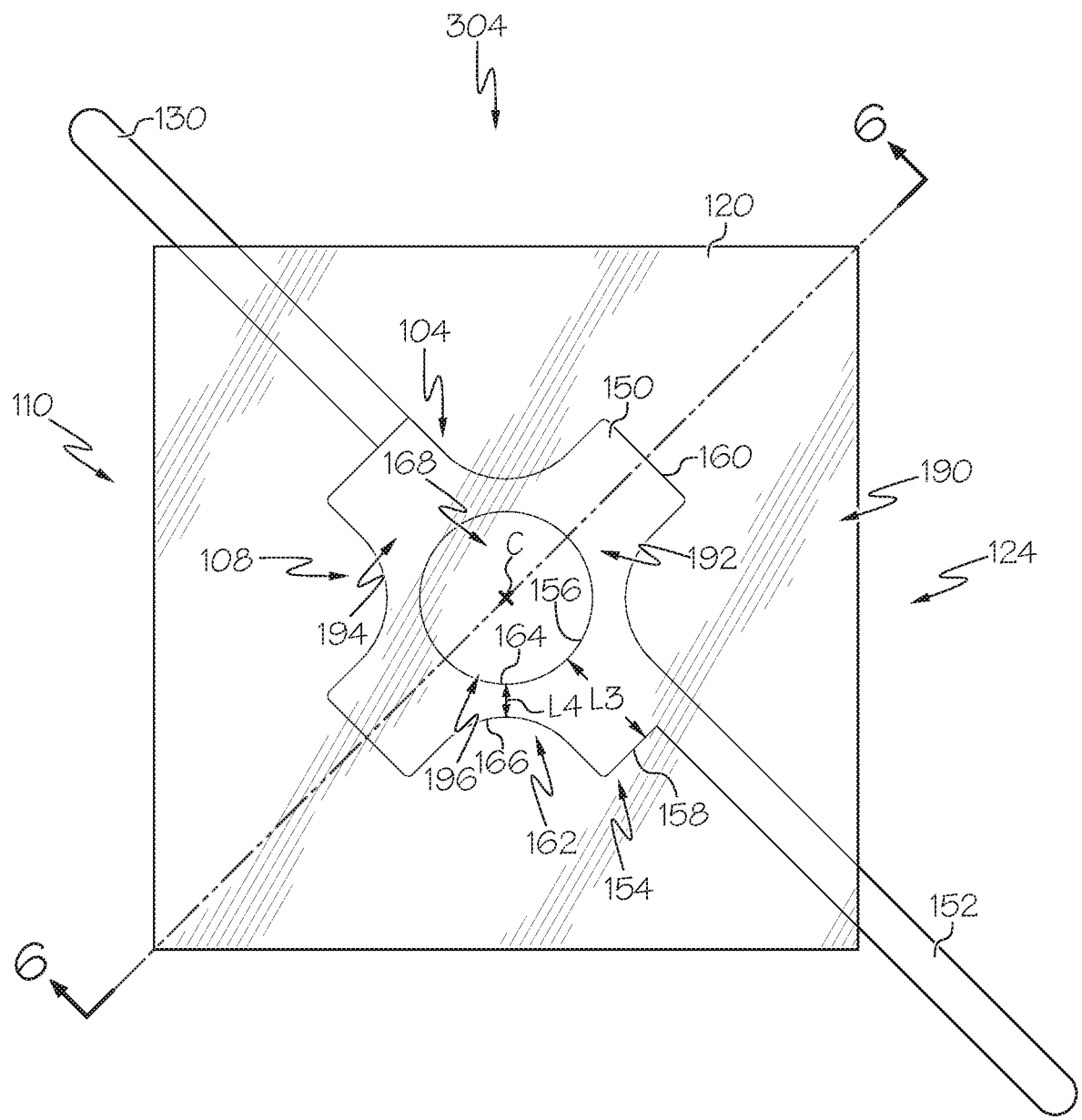
FIG. 5 schematically depicts a top view of the artificial muscle of FIG. 3, according to one or more embodiments shown and described herein.

Referring now to FIGS. 4 and 5, an example artificial muscle 304 of the therapeutic motion device 200 is depicted in more detail. The artificial muscle 304 includes a housing 110 (e.g., corresponding to the housing 324), an electrode pair 104, including a first electrode 106 and a second electrode 108, fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 304 is negatively charged.

Figure 11:
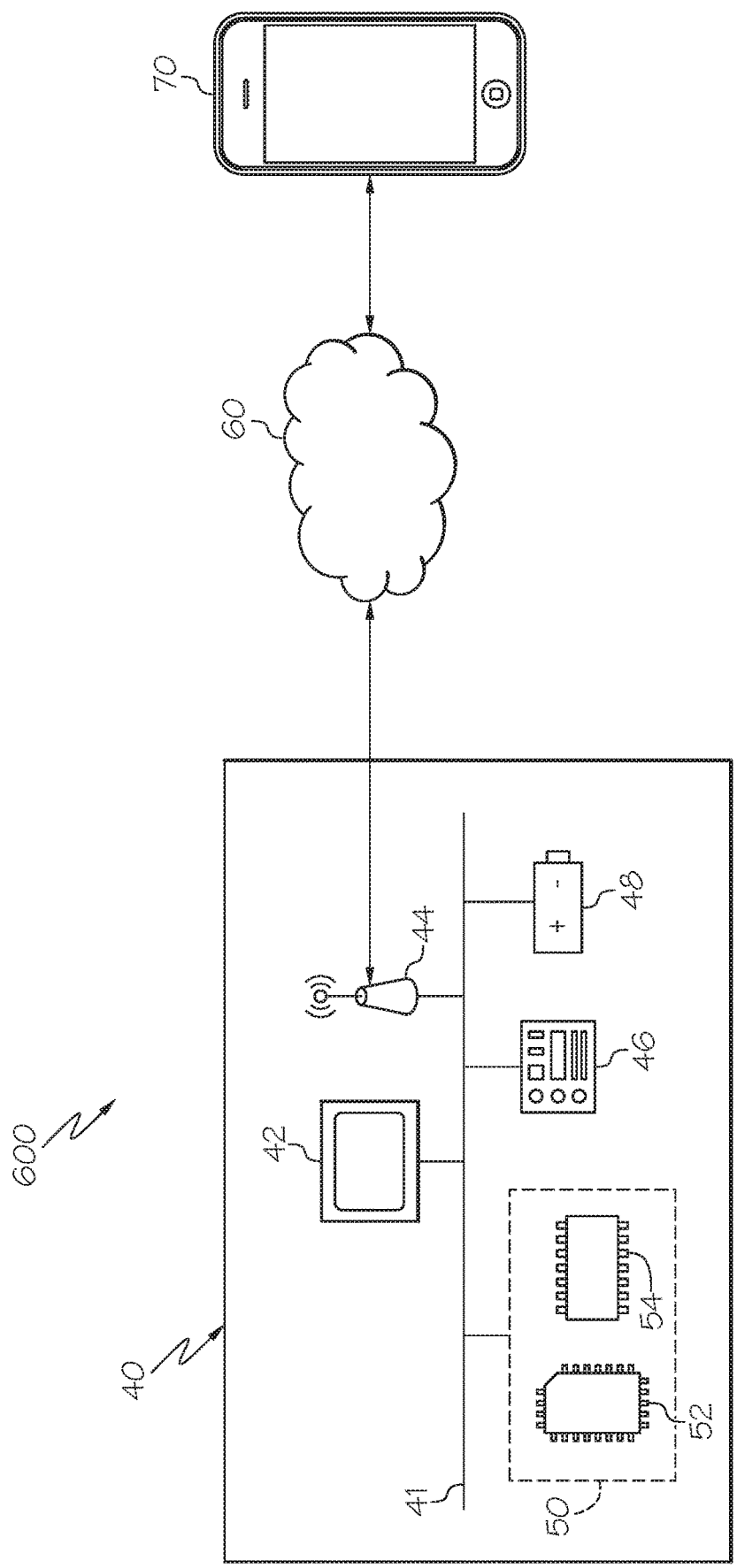
FIG. 11 schematically depicts an actuation system for operating the therapeutic motion devices of FIGS. 1A and 1B, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the first terminal 130 is coupled, either directly or in series, to a power supply and a controller of an actuation system 600, as shown in FIG. 11. Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 600 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 4 and 5, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 4 and 5, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 6:
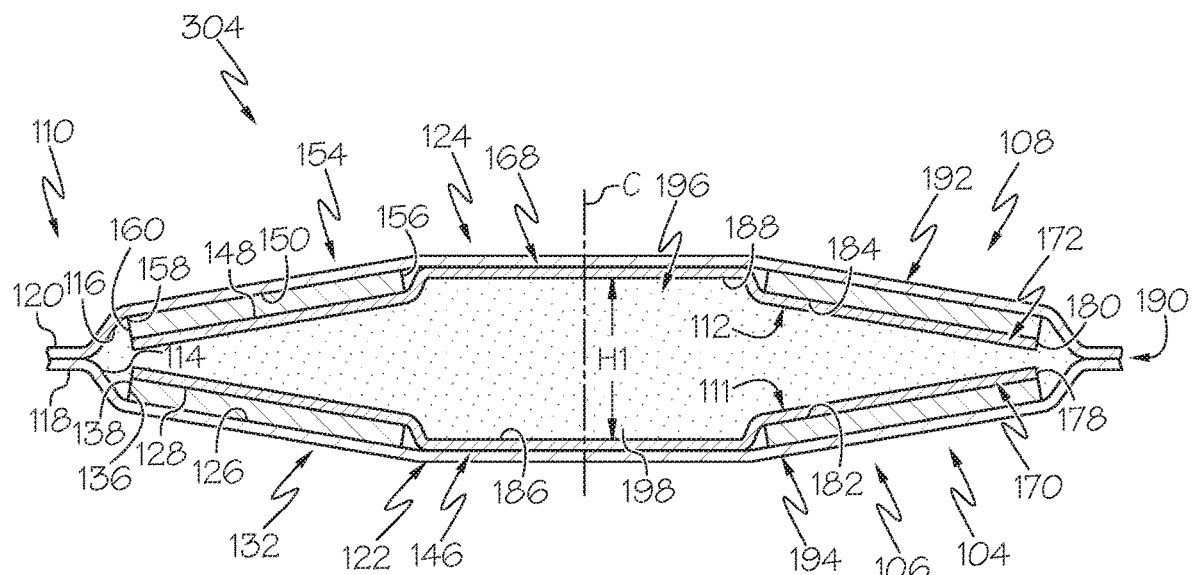
FIG. 6 schematically depicts a cross-sectional view of the artificial muscle of FIG. 4 taken along line 6-6 in FIG. 5 in a non-actuated state, according to one or more embodiments shown and described herein.
Figure 7:
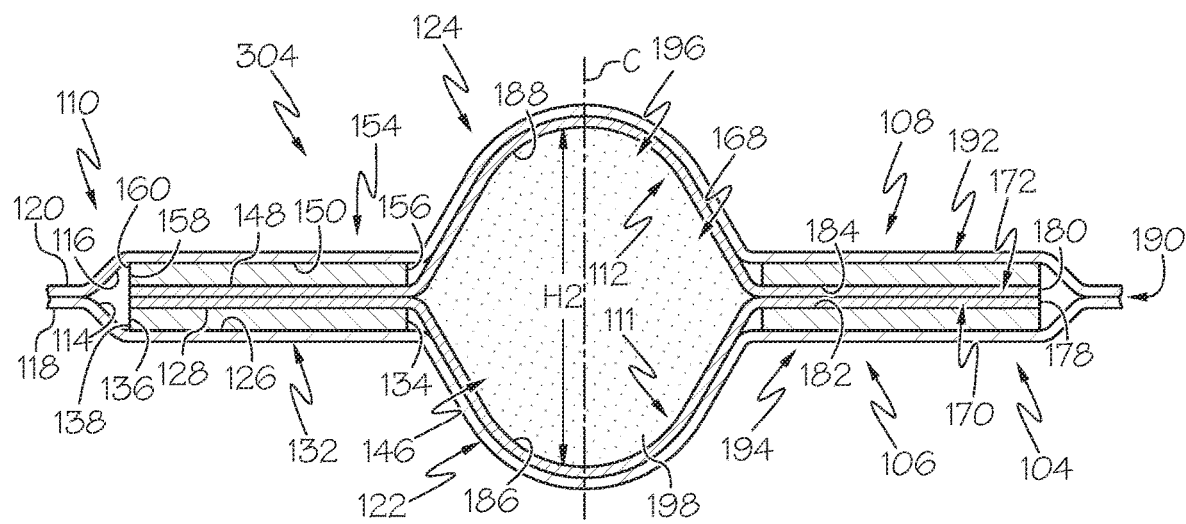
FIG. 7 schematically depicts a cross-sectional view of the artificial muscle of FIG. 4 taken along line 6-6 in FIG. 5 in an actuated state, according to one or more embodiments shown and described herein.

Referring now to FIGS. 4-9, at least one of the first electrode 106 and the second electrode 108 has a central opening formed therein between the first end 134 of the tab portions 132 and the first end 142 of the bridge portions 140. In FIGS. 6 and 7, the first electrode 106 has a central opening 146. However, it should be understood that the first electrode 106 does not need to include the central opening 146 when a central opening is provided within the second electrode 108, as shown in FIGS. 8 and 9. Alternatively, the second electrode 108 does not need to include the central opening when the central opening 146 is provided within the first electrode 106. Referring still to FIGS. 4-9, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring now to FIGS. 5-9, the artificial muscle 304 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 5, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 304, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 304 using a needle or other suitable injection device.

Referring now to FIGS. 6 and 7, the artificial muscle 304 is actuatable between a non-actuated state and an actuated state. In the non-actuated state, as shown in FIG. 6, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In FIGS. 2A, 2C, and 3A, at least one of the one or more artificial muscles 304 of the therapeutic motion devices 200 and 225 is in the non-actuated state. In the actuated state, as shown in FIG. 7, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196. In FIGS. 2B, 2C, and 3B, at least one of the one or more artificial muscles 304 of the therapeutic motion devices 200 and 225 is in the actuated state.

Referring now to FIG. 6, the artificial muscle 304 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 4, the first electrode 106 and second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 7, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply (such as power supply 48 of FIG. 11). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state.

It should be appreciated that the present embodiments of the artificial muscle 304 disclosed herein, specifically, the tab portions 132, 154 with the interconnecting bridge portions 174, 176, provide a number of improvements over actuators that do not include the tab portions 132, 154, such as hydraulically amplified self-healing electrostatic (HA-SEL) actuators described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 304 including two pairs of tab portions 132, 154 on each of the first electrode 106 and the second electrode 108, respectively, reduces the overall mass and thickness of the artificial muscle 304, reduces the amount of voltage required during actuation, and decreases the total volume of the artificial muscle 304 without reducing the amount of resulting force after actuation as compared to known HASEL actuators including donut-shaped electrodes having a uniform, radially-extending width. More particularly, the tab portions 132, 154 of the artificial muscle 304 provide zipping fronts that result in increased actuation power by providing localized and uniform hydraulic actuation of the artificial muscle 304 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 304 is actuated, expansion of the expandable fluid region 196 produces a force of 3 Newton-millimeters (N·mm) per cubic centimeter ($cm^3$) of actuator volume or greater, such as 4 N·mm per $cm^3$ or greater, 5 N·mm per $cm^3$ or greater, 6 N·mm per $cm^3$ or greater, 7 N·mm per $cm^3$ or greater, 8 N·mm per $cm^3$ or greater, or the like. In one example, when the artificial muscle 304 is actuated by a voltage of 9.5 kilovolts (kV), the artificial muscle 304 provides a resulting force of 5 N. In another example, when the artificial muscle 304 is actuated by a voltage of 10 kV the artificial muscle 304 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

As shown in FIGS. 8 and 9, another embodiment of an artificial muscle 260 is illustrated. The artificial muscle 260 is substantially similar to the artificial muscle 304. As such, like structure is indicated with like reference numerals. However, as shown, the first electrode 106 does not include a central opening. Thus, only the second electrode 108 includes the central opening 168 formed therein. As shown in FIG. 8, the artificial muscle 260 is in the non-actuated state with the first electrode 106 being planar and the second electrode 108 being convex relative to the first electrode 106. In the non-actuated state, the expandable fluid region 196 has a first height H3. In the actuated state, as shown in FIG. 9, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 260. In addition, because the total deformation is formed on only one side of the artificial muscle 260, the second height H4 of the expandable fluid region 196 of the artificial muscle 260 extends further from a longitudinal axis perpendicular to the central axis C of the artificial muscle 260 than the second height H2 of the expandable fluid region 196 of the artificial muscle 304 when all other dimensions, orientations, and volume of dielectric fluid are the same. It should be understood that embodiments of the artificial muscle 260 may be used together with or in place of the one or more artificial muscles 304 of the therapeutic motion devices 200 and 225 of FIGS. 1-3B.

Figure 10A:
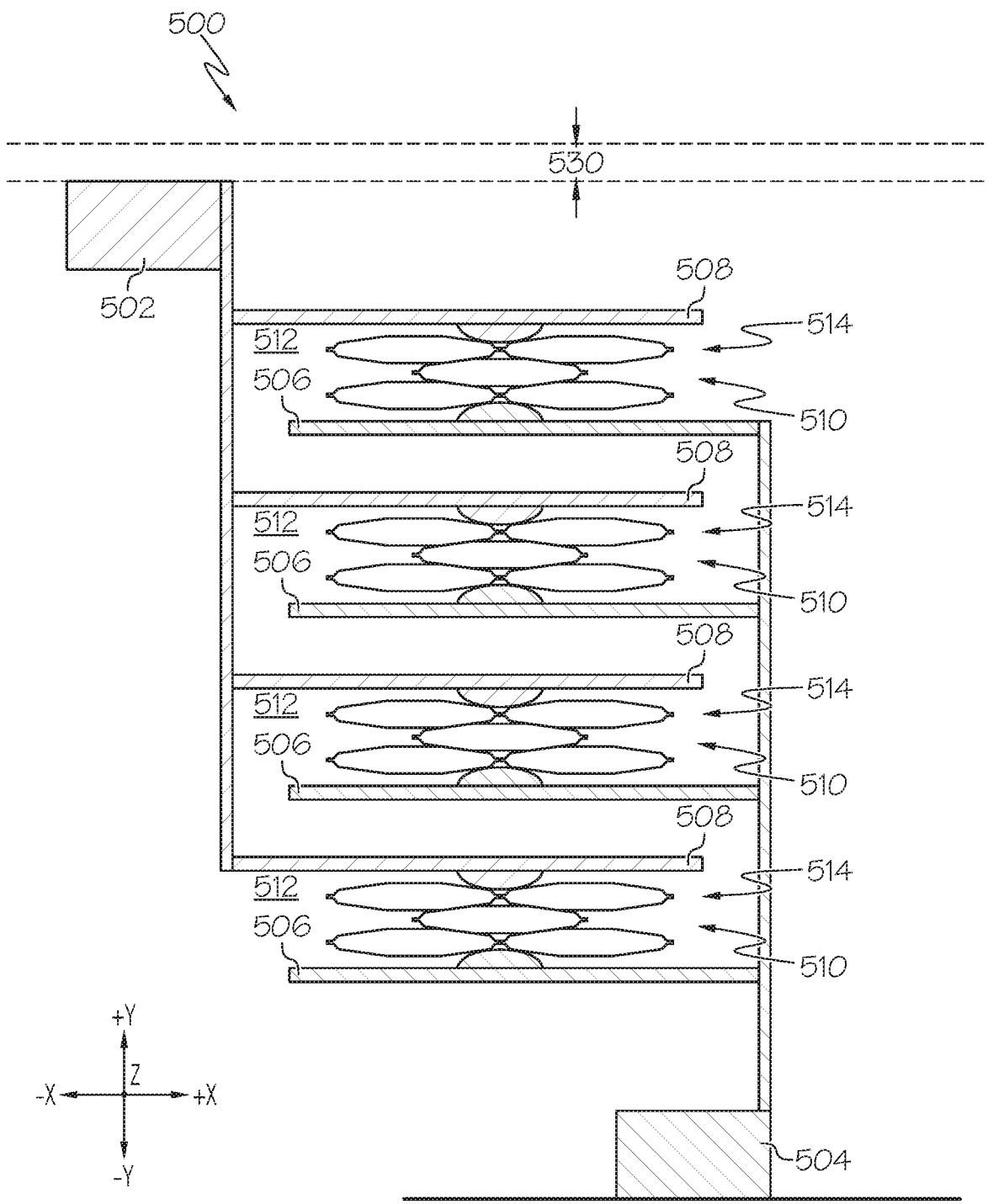
FIG. 10A schematically depicts an artificial muscle assembly for an artificial muscle drive unit in a non-actuated state, according to one or more embodiments described herein.
Figure 10B:
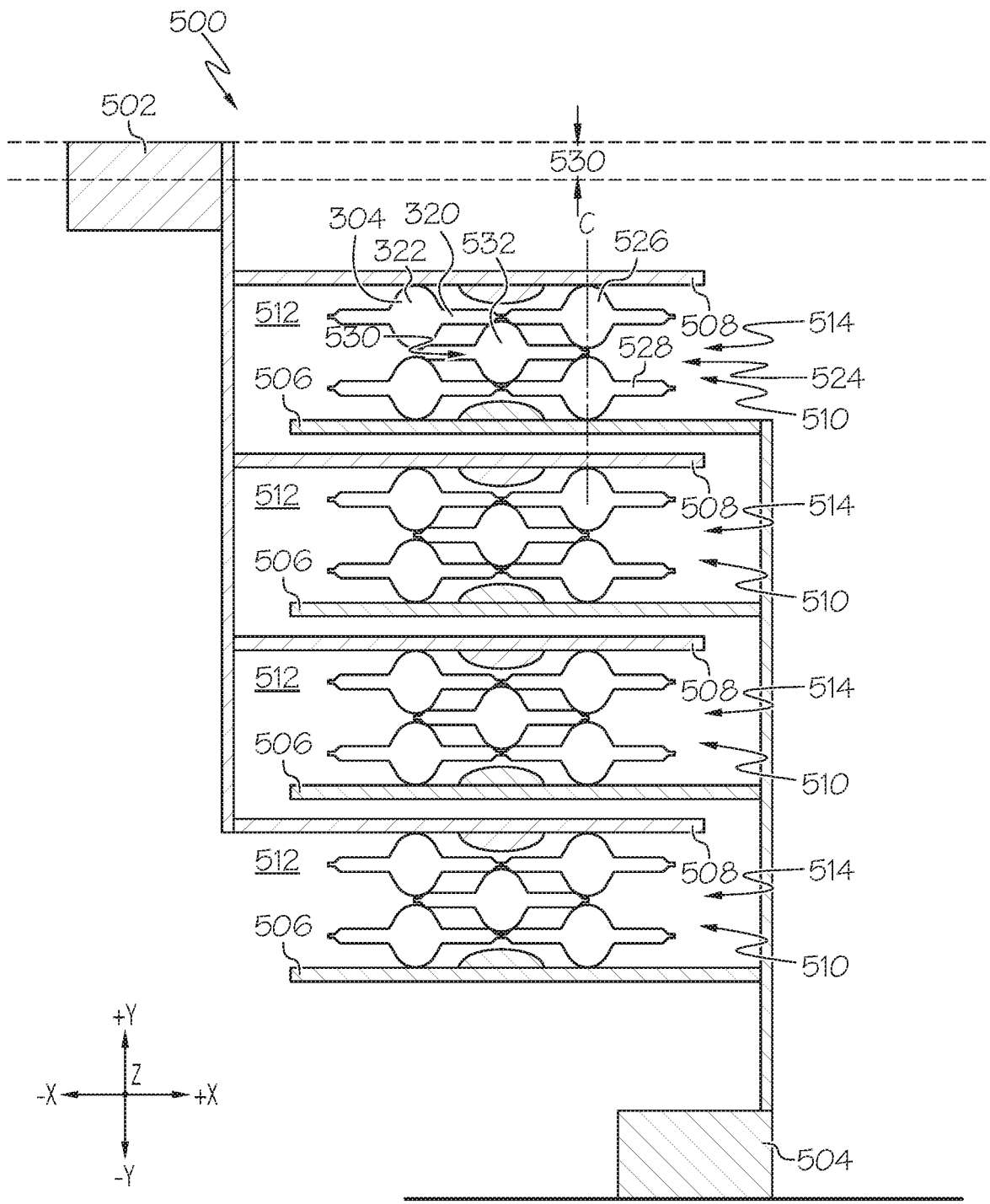
FIG. 10B schematically depicts an artificial muscle assembly for an artificial muscle drive unit in an actuated state, according to one or more embodiments described herein.

Referring now to FIGS. 10A and 10B, an artificial muscle assembly 500 is schematically depicted. In embodiments, the artificial muscle assembly 500 may be used in place of the artificial muscle assembly 300 described herein with respect to FIGS. 2A and 2B. FIG. 10A schematically depicts the artificial muscle assembly 500 in a non-actuated state. FIG. 10B schematically depicts the artificial muscle assembly 500 in an actuated state. The artificial muscle assembly 500 includes an actuation structure 502 and a mounting structure 504. In embodiments, the mounting structure 504 is coupled to one of the first support portion 202 and the second support portion 204 of the therapeutic motion device 200 described with respect to FIG. 1A, while the actuation structure 502 is coupled to the other one of the first support portion 202 and the second support portion 204.

The mounting structure 504 includes a plurality of mounting platforms 506 and the actuation structure 502 includes a plurality of actuation platforms 508. As depicted, the plurality of mounting platforms 506 are interleaved with the plurality of actuation platforms 508 to form a plurality of platform pairs 510. Each platform pair 510 includes one of the plurality of mounting platforms 506 and one of the plurality of actuation platforms 508. Each platform pair 510 forms an actuation cavity 512 between the actuation platform 508 and the mounting platform 506 that form that platform pair 510.

In embodiments, each of the platform pairs 510 is spaced from at least one adjacent one of the platform pairs 510 by at least an actuation distance 530 to provide clearance for the actuation structure 502 to move relative to the mounting structure 504 in a movement direction (e.g., the Y-direction depicted in FIGS. 10A and 10B). An artificial muscle structure 514 is disposed in each of the actuation cavities 512. Each artificial muscle structure 514 includes a plurality of the artificial muscles 304 described herein. As depicted in FIG. 10B, each artificial muscle structure 514 includes an aligned pair of artificial muscles 524 sharing a common center axis C. FIG. 10B depicts an aligned artificial pair of artificial muscles 524 including an upper artificial muscle 526 and a lower artificial muscle 528. The expandable fluid regions 322 of the artificial muscles 526 and 528 of the aligned pair of artificial muscles 524 are aligned to provide an added amount of displacement to the actuation structure 502. Each artificial muscle structure 514 also includes an offset artificial muscle 532 having a center axis that is offset from the common center axis C of the aligned pair of artificial muscles 524 in a direction perpendicular to the movement direction. In embodiments, an electrode region 322 (e.g., of the housing 110 described with respect to FIGS. 4-9) of the offset artificial muscle 532 contacts the expandable fluid regions 322 of housings (e.g., of the housing 110 described with respect to FIGS. 4-9) of both of the artificial muscles in the aligned pair of artificial muscles 524.

In embodiments, each artificial muscle structure 514 includes a plurality of artificial muscles arranged in an alternating stacked arrangement, where the artificial muscle structure 514 includes a plurality of sheets of artificial muscles that are disposed on top of one another in an offset overlapping arrangement such that the expandable fluid regions 322 of one sheet of artificial muscles are offset from expandable fluid regions 322 of an adjacent sheet, while electrode regions 320 of artificial muscles in adjacent sheets at least partially overlap one another. The artificial muscle structures 514 described herein may include any number of sheets of artificial muscles arranged in the alternating stacked arrangement. Additionally, it should be understood that each sheet of artificial muscles of each artificial muscle structure 514 may include the same or different numbers of artificial muscles, depending on the implementation.

The alternating stacked arrangement of each artificial muscle structure 514 adds the force generated by the aligned pair of artificial muscles 524 to the offset artificial muscle 532 to add to the magnitude of the force applied to the actuation structure 502. Each muscle structure 514 of the artificial muscle assembly 500 may include any number of aligned pairs of artificial muscles and offset artificial muscles arranged in the depicted alternating stacked arrangement to provide any amount of actuation distance 530 and magnitude of force. For example, rather than including an aligned pair of artificial muscles 524, each artificial muscle structure 514 may include any number n of aligned artificial muscles sharing a comment center axis C, and include n−1 offset artificial muscles contacting two adjacent ones of the aligned artificial muscles. Each artificial muscle structure 514 may also include any number of aligned pairs (or sets of more than 2) of artificial muscles stacked in a direction perpendicular to the movement direction (e.g., the X-direction) to increase the magnitude of forced provided by the artificial muscle assembly 500. In embodiments, the alternating stacked arrangement of each artificial muscle structure includes offset artificial muscles having expandable fluid regions that contact tab portions of four artificial muscles (e.g., in two adjacent aligned pairs of artificial muscles).

Referring now to FIG. 11, an actuation system 600 may be provided for operating the therapeutic motion devices 200 and 225 described herein with respect to FIGS. 1A and 1B. For example, the actuation system 600 may correspond to the actuation system 222 and 252 described herein with respect to FIGS. 1A and 1B. As such, the actuation system 600 may operate the or more artificial muscles 304 of the therapeutic motion devices 200 and 225. The actuation system 600 may comprise a controller 50, an operating device 46, a power supply 48, a display device 42, network interface hardware 44, and a communication path 41 communicatively coupled these components, some or all of which may be disposed in an onboard control unit 40, which may be disposed on the therapeutic motion device 200, 225.

The controller 50 comprises a processor 52 and a non-transitory electronic memory 54 to which various components are communicatively coupled. In some embodiments, the processor 52 and the non-transitory electronic memory 54 and/or the other components are included within a single device. In other embodiments, the processor 52 and the non-transitory electronic memory 54 and/or the other components may be distributed among multiple devices that are communicatively coupled. The controller 50 includes non-transitory electronic memory 54 that stores a set of machine-readable instructions. The processor 52 executes the machine-readable instructions stored in the non-transitory electronic memory 54. The non-transitory electronic memory 54 may comprise RAM, ROM, flash memories, hard drives, or any device capable of storing machine-readable instructions such that the machine-readable instructions can be accessed by the processor 52. Accordingly, the actuation system 600 described herein may be implemented in any conventional computer programming language, as pre-programmed hardware elements, or as a combination of hardware and software components. The non-transitory electronic memory 54 may be implemented as one memory module or a plurality of memory modules.

In some embodiments, the non-transitory electronic memory 54 includes instructions for executing the functions of the actuation system 600. The instructions may include instructions for operating the therapeutic motion devices 200 and 225, for example, instructions for actuating the one or more artificial muscles 304, individually or collectively, and actuating the artificial muscles stacks, individually or collectively.

The processor 52 may be any device capable of executing machine-readable instructions. For example, the processor 52 may be an integrated circuit, a microchip, a computer, or any other computing device. The non-transitory electronic memory 54 and the processor 52 are coupled to the communication path 41 that provides signal interconnectivity between various components and/or modules of the actuation system 600. Accordingly, the communication path 41 may communicatively couple any number of processors with one another, and allow the modules coupled to the communication path 41 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 11, the communication path 41 communicatively couples the processor 52 and the non-transitory electronic memory 54 of the controller 50 with a plurality of other components of the actuation system 600. For example, the actuation system 600 depicted in FIG. 11 includes the processor 52 and the non-transitory electronic memory 54 communicatively coupled with the operating device 46 and the power supply 48.

The operating device 46 allows for a user to control operation of the artificial muscles 304 of the therapeutic motion devices 200 and 225. In some embodiments, the operating device 46 may be a switch, toggle, button, or any combination of controls to provide user operation. The operating device 46 is coupled to the communication path 41 such that the communication path 41 communicatively couples the operating device 46 to other modules of the actuation system 600. The operating device 46 may provide a user interface for receiving user instructions as to a specific operating configuration of the therapeutic motion devices 200 and 225, such as generating a cascading, patterned, stochastic or uniform rhythm.

The power supply 48 (e.g., battery) provides power to the one or more artificial muscles 304 of the therapeutic motion devices 200 and 225. In some embodiments, the power supply 48 is a rechargeable direct current power source. It is to be understood that the power supply 48 may be a single power supply or battery for providing power to the one or more artificial muscles 304 of the therapeutic motion devices 200 and 225. A power adapter (not shown) may be provided and electrically coupled via a wiring harness or the like for providing power to the one or more artificial muscles 304 of the therapeutic motion devices 200 and 225 via the power supply 48.

In some embodiments, the actuation system 600 also includes a display device 42. The display device 42 is coupled to the communication path 41 such that the communication path 41 communicatively couples the display device 42 to other modules of the actuation system 600. The display device 42 may be located on the therapeutic motion device 200, for example, as part of the onboard control unit 40, and may output a notification in response to an actuation state of the artificial muscles 304 of the therapeutic motion devices 200 and 225 or indication of a change in the actuation state of the one or more artificial muscles 304 of the therapeutic motion devices 200 and 225. Moreover, the display device 42 may be a touchscreen that, in addition to providing optical information, detects the presence and location of a tactile input upon a surface of or adjacent to the display device 42. Accordingly, the display device 42 may include the operating device 46 and receive mechanical input directly upon the optical output provided by the display device 42.

In some embodiments, the actuation system 600 includes network interface hardware 44 for communicatively coupling the actuation system 600 to a portable device 70 via a network 60. The portable device 70 may include, without limitation, a smartphone, a tablet, a personal media player, or any other electric device that includes wireless communication functionality. It is to be appreciated that, when provided, the portable device 70 may serve to provide user commands to the controller 50, instead of the operating device 46. As such, a user may be able to control or set a program for controlling the artificial muscles 304 of the therapeutic motion devices 200 and 225 utilizing the controls of the operating device 46. Thus, the artificial muscles 304 of the therapeutic motion devices 200 and 225 may be controlled remotely via the portable device 70 wirelessly communicating with the controller 50 via the network 60.

It should now be understood that embodiments described herein are directed to therapeutic motion devices including an artificial muscle drive unit including one or more artificial muscles coupled to actuation arms that assist or resist movement of a limb of a user supported by the therapeutic motion device. The artificial muscles of the artificial drive units include expandable fluid regions that expand in a movement direction responsive to application of a voltage thereto. Expansion of the one or more artificial muscles provides force to the actuation arms, which are coupled to support portions supporting the user's limb. That is, the one or more artificial muscles are actuatable on demand to provide resistance or assistance to motion of the user's limb. Moreover, the artificial muscle drive unit may include any number of artificial muscles arranged in any pattern to provide a customizable amount of force. In embodiments, the artificial muscles are arranged in an alternating stacked arrangement such that artificial muscles in different stacks of artificial muscles that are offset from one another in a direction perpendicular to the movement direction add to one another to provide greater force than embodiments including a single stack of artificial muscles. The artificial muscle drive units described herein are more portable and quiet that existing pneumatic or electric-actuation-based therapeutic motion devices.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A therapeutic motion device comprising:
    a support structure comprising a first support portion and a second support portion, wherein:
        the first support portion rotatably coupled to the second support portion, and
        at least one of the first support portion and the second support portion is movable relative to the other of the first support potion and the second support portion;
    a first actuation arm extending from the first support portion;
    a second actuation arm extending from the second support portion; and
    an artificial muscle drive unit directly coupled to the first actuation arm and the second actuation arm, the artificial muscle drive unit comprising:
        an outer casing defining a cavity; and
        an artificial muscle assembly disposed within the cavity, the artificial muscle assembly comprising:
            an actuation plate directly connected to the first actuation arm, the actuation plate movable within the cavity relative to the outer casing, the second actuation arm directly connected to the outer casing; and
            one or more artificial muscles expandable in a movement direction to contact the actuation plate and provide a movement force to at least one of the first support portion and the second support portion by displacing at least one of the first actuation arm and the second actuation arm.

2. The therapeutic motion device of claim 1, wherein each of the one or more artificial muscles comprise:
    a housing comprising an electrode region and an expandable fluid region; and
    a dielectric fluid housed within the housing.

3. The therapeutic motion device of claim 2, wherein each of the one or more artificial muscles further comprise an electrode pair positioned in the electrode region of the housing, the electrode pair comprising a first electrode fixed to a first surface of the housing and a second electrode fixed to a second surface of the housing, wherein the electrode pair is actuatable between a non-actuated state and an actuated state such that actuation from the non-actuated state to the actuated state directs the dielectric fluid into the expandable fluid region, expanding the expandable fluid region thereby applying pressure to at least one of the first actuation arm and the second actuation arms.

4. The therapeutic motion device of claim 3, wherein the artificial muscle drive unit comprises a plurality of artificial muscles stacked on one another in the movement direction.

5. The therapeutic motion device of claim 4, wherein expandable fluid regions of at least two of the plurality of artificial muscles contact one another such that expansion of the expandable fluid regions of the at least two artificial muscles adds in the movement direction.

6. The therapeutic motion device of claim 3, wherein:
    the first electrode and the second electrode each comprise two or more tab portions and two or more bridge portions;
    each of the two or more bridge portions interconnects adjacent tab portions; and
    at least one of the first electrode and the second electrode comprises a central opening positioned between the two or more tab portions and encircling the expandable fluid region.

7. The therapeutic motion device of claim 1, wherein:
    the support structure comprises a base,
    the first support portion and the second support portion are held by the base in spaced relation to one another such that there is a gap between the first support portion and the second support portion, and
    at least one of the first support portion and the second support portion is rotatably coupled to the base.

8. The therapeutic motion device of claim 1, wherein the artificial muscle assembly further comprises a return force device disposed in the cavity, wherein the return force device providing a return force that opposes the movement force provided by the one or more artificial muscles.

9. The therapeutic motion device of claim 1, wherein the artificial muscle assembly further comprises:
    a plurality of actuation platforms coupled to one of the first support portion and the second support portion; and
    a plurality of mounting platforms coupled to the other one of the first support portion and the second portion, wherein:
        the plurality of actuation platforms are interleaved with the plurality of mounting platforms to form a plurality of actuation cavities between plate pairs, each plate pair comprising one of the plurality of mounting platforms and one of the plurality of actuation platforms,
the one or more artificial muscles comprises a plurality of artificial muscle structures disposed in each of the actuation cavities, and
the expansion of each artificial muscle of each of the artificial muscle structures causes the actuation platform of each plate pair to move in a movement direction away from the respective mounting platform of each plate pair.

10. The therapeutic motion device of claim 9, wherein each artificial muscle structure comprises:
a first aligned pair of artificial muscles sharing a common central axis; and an offset artificial muscle;
wherein each artificial muscle comprises a housing comprising an electrode region and an expandable fluid region;
wherein the expandable fluid region of the offset artificial muscle is in contact with the electrode regions of the first aligned pair of artificial muscles.

11. The therapeutic motion device of claim 10, wherein each artificial muscle structure further comprises a second aligned pair of artificial muscles sharing a second common central axis, wherein the expandable fluid region of the housing of the offset artificial muscle also contacts the electrode regions of the housings of both of the second aligned pair of artificial muscles.

12. The therapeutic motion device of claim 1, further comprising:
a rotating connector that connects the first support portion to the second support portion, the rotating connector comprising a rotating portion attached to one of the first support portion and the second support portion and a stationary portion connected to the other of the first support portion and the second support portion; and
a motion resistance device coupled to the rotating portion, the motion resistance device comprising an engaging element selectively engageable with the rotating portion to resist relative motion between the first and second support portions.

13. A therapeutic motion device comprising:
a support structure comprising a first support portion and a second support portion, wherein:
the first support portion is rotatably coupled to the second support portion, and
at least one of the first support portion and the second support portion is movable relative to the other of the first support potion and the second support portion;
an artificial muscle drive unit connected to the first support portion and the second support portion via a first actuation arm extending from the first support portion and a second actuation arm extending from the second support portion, the artificial muscle drive unit comprising:
an outer casing defining a cavity; and
an artificial muscle assembly disposed within the cavity, the artificial muscle assembly comprising:
an actuation plate directly connected to the first actuation arm, the actuation plate movable within the cavity relative to the outer casing, the second actuation arm directly connected to the outer casing; and
one or more artificial muscles expandable in a movement direction to contact the actuation plate and directly apply a force to at least one of the first actuation arm and the second actuation arm, wherein each of the one or more artificial muscles comprise:
a housing comprising an electrode region and an expandable fluid region;
a dielectric fluid housed within the housing; and
an electrode pair positioned in the electrode region of the housing, the electrode pair comprising a first electrode fixed to a first surface of the housing and a second electrode fixed to a second surface of the housing, wherein the electrode pair is actuatable between a non-actuated state and an actuated state such that actuation from the non-actuated state to the actuated state directs the dielectric fluid into the expandable fluid region, expanding the expandable fluid region thereby applying force to the at least one of the first actuation arm and second actuation arm.

14. The therapeutic motion device of claim 13, wherein:
the first electrode and the second electrode each comprise two or more tab portions and two or more bridge portions;
each of the two or more bridge portions interconnects adjacent tab portions; and
at least one of the first electrode and the second electrode comprises a central opening positioned between the two or more tab portions and encircling the expandable fluid region.

15. The therapeutic motion device of claim 14, wherein the first electrode and the second electrode each includes two pairs of tab portions and two pairs of bridge portions, each bridge portion interconnecting adjacent a pair of adjacent tab portions, each tab portion diametrically opposing an opposite tab portion.

16. The therapeutic motion device of claim 13, wherein the artificial muscle drive unit comprises a plurality of artificial muscles stacked on one another in a direction of the force.

17. A method for actuating a therapeutic motion device, the method comprising:
generating a voltage using a power supply electrically coupled to an electrode pair of an artificial muscle, the artificial muscle disposed in an artificial muscle drive unit directly coupled to a first actuation arm extending from a first support portion and a second actuation arm extending from a second support portion of the therapeutic motion device, the artificial muscle drive unit comprising:
an outer casing defining a cavity; and
an artificial muscle assembly disposed within the cavity, the artificial muscle assembly comprising:
an actuation plate directly connected to the first actuation arm, the actuation plate movable within the cavity relative to the outer casing, the second actuation arm directly connected to the outer casing; and
one or more artificial muscles expandable in a movement direction to contact the actuation plate and provide a movement force to the first support portion by displacing the first actuation arm, wherein:
the artificial muscle comprises a housing having an electrode region and an expandable fluid region;
the electrode pair is positioned in the electrode region of the housing;

the electrode pair comprises a first electrode fixed to a first surface of the housing and a second electrode fixed to a second surface of the housing; and a dielectric fluid is housed within the housing; and applying the voltage to the electrode pair of the artificial muscle, thereby actuating the electrode pair from a non-actuated state to an actuated state such that the dielectric fluid is directed into the expandable fluid region of the housing and expands the expandable fluid region, thereby providing force to at least one of the first support portion and the second support portion of the therapeutic motion device via at least one of the first actuation arm and the second actuation arm to resist or assist movement of at least one of the first support portion and the second support portion.

18. The method of claim 17, wherein the artificial muscle is one of a plurality of artificial muscles stacked in a direction of the force within the artificial muscle drive unit.

19. The method of claim 17, the method further comprising:

removing the voltage of the electrode pair to remove the force from at least one of the first support portion and the second support portion; and applying a return force to at least one of the first support portion and the second portion via a return force device of the artificial muscle drive unit, wherein the return force opposes the force provided by the artificial muscle.

* * * * *

UNITED STATES PATENT AND TRADEMARK OFFICE
CERTIFICATE OF CORRECTION

| | | |
|---|---|---|
| PATENT NO. | : 12,263,130 B2 | Page 1 of 1 |
| APPLICATION NO. | : 16/931589 | |
| DATED | : April 1, 2025 | |
| INVENTOR(S) | : Michael P. Rowe and Danil Prokhorov | |

It is certified that error appears in the above-identified patent and that said Letters Patent is hereby corrected as shown below:

In the Specification

In Column 14, Line(s) 58, delete "example" and insert --examples--, therefor.

In Column 19, Line(s) 12, before "or", insert --one--.

Signed and Sealed this
Thirteenth Day of May, 2025

Coke Morgan Stewart
*Acting Director of the United States Patent and Trademark Office*